(12) United States Patent
Chin et al.

(10) Patent No.: US 11,933,402 B2
(45) Date of Patent: Mar. 19, 2024

(54) RUBBER GASKET WITH MOLDED-IN PLASTIC COMPRESSION LIMITER

(71) Applicant: Freudenberg-NOK General Partnership, Plymouth, MI (US)

(72) Inventors: Christopher Chin, Hooksett, NH (US); James Grady, Chester, NH (US); Michael Blake, Northville, MI (US); Saikrishna Sundararaman, Canton, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 58 days.

(21) Appl. No.: 17/584,519

(22) Filed: Jan. 26, 2022

(65) Prior Publication Data
US 2023/0235821 A1 Jul. 27, 2023

(51) Int. Cl.
*F16J 15/10* (2006.01)

(52) U.S. Cl.
CPC ................. *F16J 15/104* (2013.01)

(58) Field of Classification Search
CPC .............. F16J 15/12; F16J 15/104
See application file for complete search history.

(56) References Cited

U.S. PATENT DOCUMENTS

| | | | |
|---|---|---|---|
| 3,191,950 A | 6/1965 | Hiltner | |
| 3,259,404 A * | 7/1966 | Papenguth | F16J 15/104 285/212 |
| 3,342,501 A * | 9/1967 | Meyer | B29C 45/14344 277/639 |
| 4,655,463 A * | 4/1987 | Inciong | F16J 15/127 277/637 |
| 5,671,927 A * | 9/1997 | Schweiger | F16J 15/123 277/630 |
| 6,460,859 B1 * | 10/2002 | Hammi | F16J 15/127 277/649 |
| 9,269,967 B2 * | 2/2016 | Masaka | F16J 15/104 |
| 10,145,498 B2 * | 12/2018 | Shimizu | F16L 23/02 |
| 2010/0143076 A1 * | 6/2010 | Matsumoto | F16J 15/104 411/533 |
| 2011/0101627 A1 | 5/2011 | Labrenz et al. | |
| 2011/0140374 A1 * | 6/2011 | Dubiel | F16J 15/061 277/628 |
| 2012/0187638 A1 * | 7/2012 | Bauer | F16J 15/108 264/261 |

(Continued)

FOREIGN PATENT DOCUMENTS

JP 2011190892 A * 9/2011 ............. F16J 15/104

OTHER PUBLICATIONS

Extended European Search Report dated Jun. 2, 2023 (corresponding to EP 23150713.8).

*Primary Examiner* — Eugene G Byrd
(74) *Attorney, Agent, or Firm* — Daniel J. Sepanik, Esq.; Harness, Dickey & Pierce, P.L.C.

(57) ABSTRACT

A gasket includes a plurality of compression limiters each including a plastic body having a fastener aperture extending there through and a plurality of flow holes extending there through. An elastomeric body defines a perimeter sealing body molded around the plurality of compression limiters at spaced locations around the perimeter sealing body. The elastomeric body extends through the plurality of flow holes in the plurality of compression limiters.

6 Claims, 2 Drawing Sheets

(56) References Cited

U.S. PATENT DOCUMENTS

2013/0004696 A1* 1/2013 Volgers .............. B60N 2/42709
428/43
2017/0203798 A1 7/2017 Bhosale et al.
2020/0003307 A1* 1/2020 Grill ...................... F16J 15/104

* cited by examiner

RUBBER GASKET WITH MOLDED-IN PLASTIC COMPRESSION LIMITER

FIELD

The present disclosure relates to a gasket with molded-in plastic compression limiter.

BACKGROUND

This section provides background information related to the present disclosure which is not necessarily prior art.

Rubber gaskets with molded-in sintered metal compression limiters have been known. Each of the sintered metal compression limiters need to be case treated (process to clean limiters and then apply adhesive). This process accounts for approximately 40% of the overall manufacturing cost of the gasket.

SUMMARY

This section provides a general summary of the disclosure, and is not a comprehensive disclosure of its full scope or all of its features.

A gasket includes a plurality of compression limiters each including a plastic body having a fastener aperture extending there through and a plurality of flow holes extending there through. An elastomeric body defines a perimeter sealing body molded around the plurality of compression limiters at spaced locations around the perimeter sealing body. The elastomeric body extends through the plurality of flow holes in the plurality of compression limiters.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
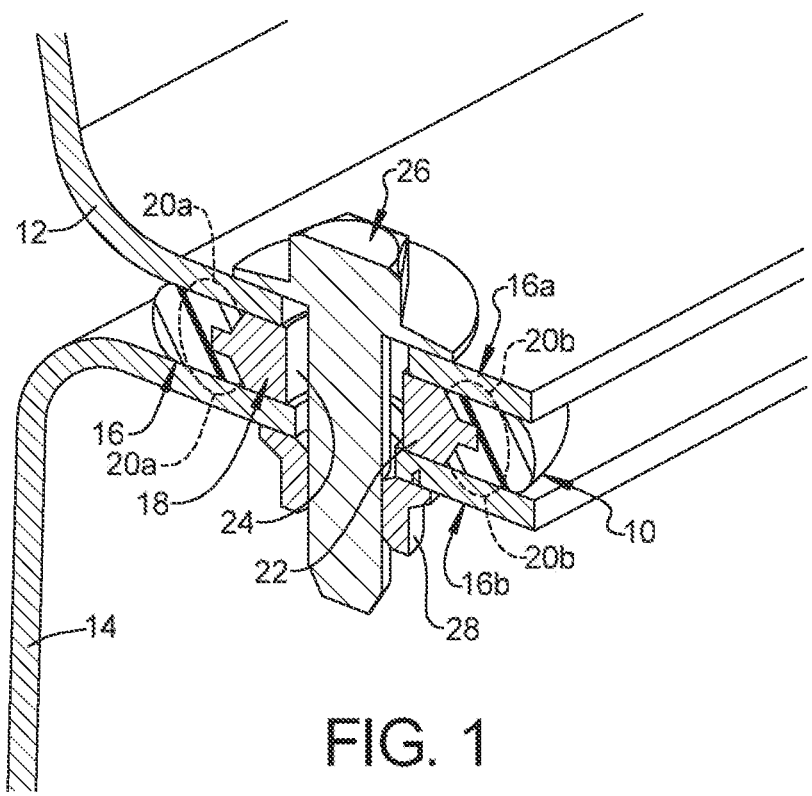
FIG. 1 is a cross-sectional isometric view of a rubber gasket with a molded-in plastic compression limiter disposed between first and second members.

With reference to FIG. 1, a gasket 10 is shown for sealing a gap between a first member 12 and a second member 14. The gasket incudes an elastomeric body 16 molded around a plurality of plastic compression limiters 18 spaced along the perimeter of the elastomeric body 16.

The elastomeric body 16 can be made from rubber, silicone, or other elastomeric material. The elastomeric body 16 can include a pair of raised sealing beads 20a, 20b on upper and lower surfaces 16a, 16b and extending around the perimeter of the elastomeric body 16. The pair of raised sealing beads 20a, 20b extend vertically above and below compression limiters 18. The pair of raised seal beads 20a, 20b can encircle the compression limiters and can merge into a single or remain as a pair of distinct seal beads 20a, 20b extending between the spaced compression limiters.

The plastic compression limiter 18 includes a plastic body 22 having a fastener aperture 24 that is configured to receive a bolt 26 therethrough, as best shown in FIG. 1. In particular, the first member 12 and the second member each include a fastener aperture 12a, 14a aligned with the fastener aperture 24 in the plastic compression limiters 18. The bolt 26 extends through the fastener apertures 12a, 14a in the first and second members 12, 14 and through the fastener aperture 24 in the plastic compression limiter. The bolt 26 can be threaded into a nut 28 in order to draw the first and second members 12, 14 together and to compress the seal beads 20a, 20b of the elastomeric body 16 until the first and second member 12, 14 contact upper and lower surfaces 18a, 18b of the compression limiter 18, as shown in FIG. 1.

Figure 2:
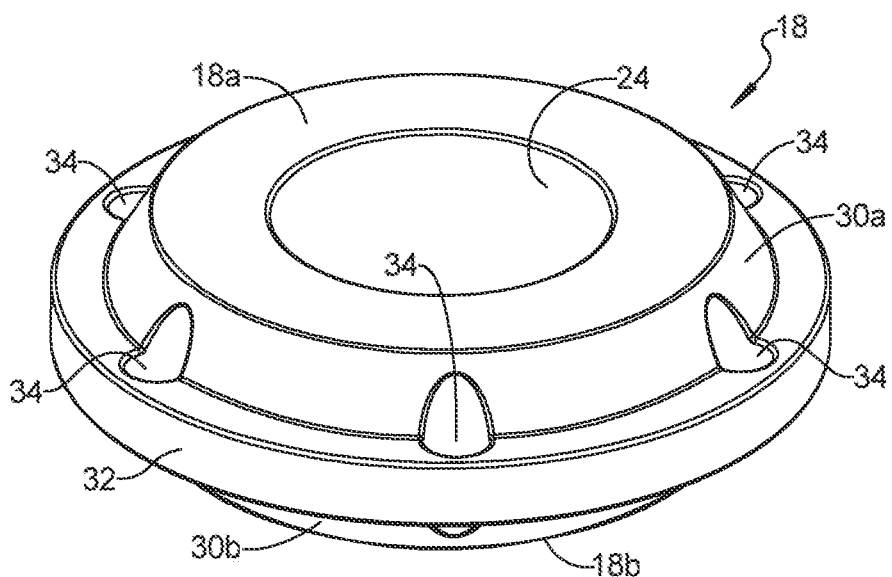
FIG. 2 is a perspective view of a plastic compression limiter according to the principles of the present disclosure.
Figure 3:
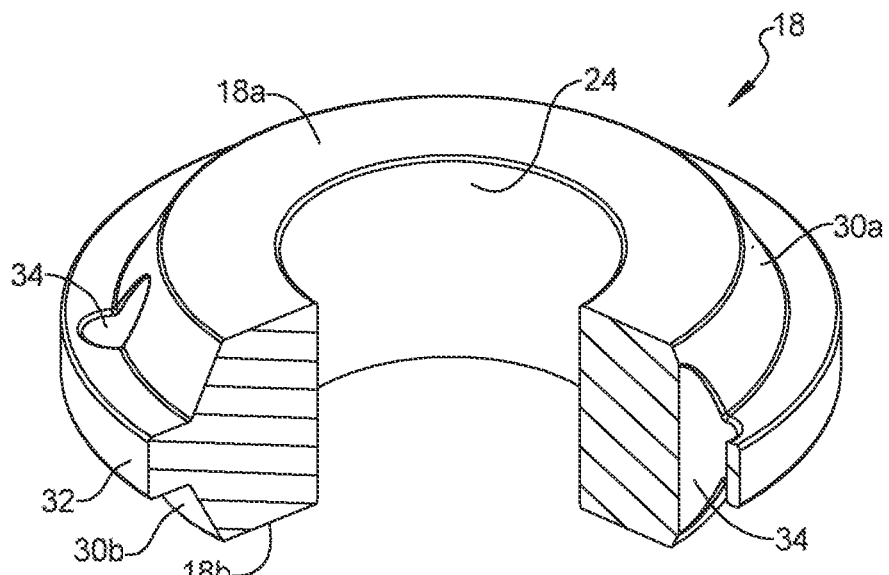
FIG. 3 is a partial cut-away perspective view of the plastic compression limiter shown in FIG. 2.
Figure 4:
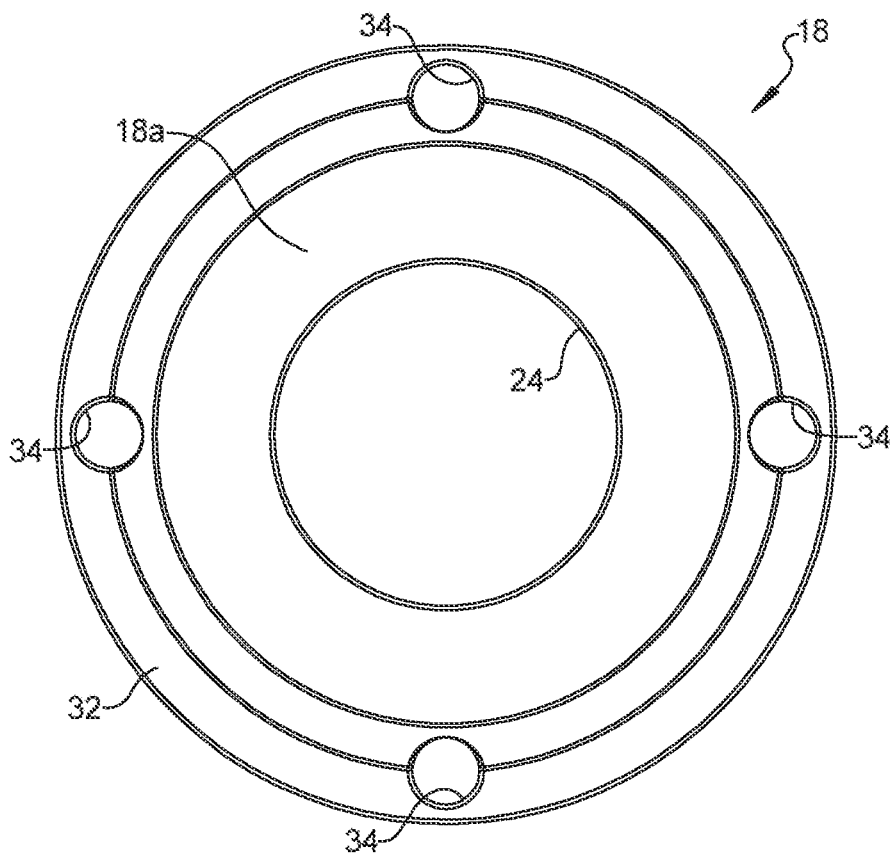
FIG. 4 is a plan view of an alternative plastic compression limiter with four flow holes.

The plastic compression limiter 18 will now be described with reference to FIGS. 2 and 3. The plastic compression limiter 18 can be formed from engineering plastic. The plastic compression limiter 18 includes upper and lower surfaces 18a, 18b with the fastener aperture 24 extending through the upper and lower surfaces 18a, 18b. The plastic compression limiter 18 includes an upper conical surface 30a extending from the upper surface 18a and a lower conical surface 30b extending from the lower surface 18b. The upper conical surface 30a and the lower conical surface 30b each terminate at a radially outwardly extending flange portion 32. A plurality of flow holes 34 are provided through the plastic compression limiters 18, wherein the elastomeric body 16 is molded into the flow holes. The plurality of flow holes 34 extend through one or both of the conical surfaces 30a, 30b and the flange portion 32. The number of flow holes 34 can be selected to allow the compression limiters 18 to be properly restrained within the elastomeric body 16. As shown in FIGS. 2 and 3, six flow holes 34 are shown while in the embodiment of FIG. 4, four flow holes 34 are shown. It should be understood that any plurality of flow holes can be used with flow holes 34 extending partially or fully through the compression limiters 18.

The present disclosure allows the use of plastic compression limiters with molded gaskets to eliminate corrosion concerns, cleaning process and adhesive application process associated with metallic compression limiters while reducing the overall gasket weight. The gasket 10 can be used in numerous applications including, for example, battery enclosures with numerous compression limiters 18 spaced around the perimeter of the gasket 10. Replacing the sintered metal compression limiters with plastic compression limiters reduces 25% of the overall manufacturing cost of the gasket.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gasket, comprising:
a plurality of compression limiters each including a plastic body having a single aperture extending through a center of the plastic body, the plastic body having a radially outwardly extending annular flange region and an upper protruding portion and a lower protruding portion integrally formed with and extending from the radially outwardly extending annular flange region in opposite directions, a plurality of flow holes each extending partially through the radially outwardly extending annular flange region and partially through the upper protruding portion and the lower protruding portion; and an elastomeric body defining a perimeter sealing body molded around the plurality of compression limiters with each of the plurality of compression limiters being spaced form one another at spaced locations around the perimeter sealing body, the elastomeric body extending through the plurality of flow holes in each of the plurality of compression limiters.

2. The gasket according to claim 1, wherein the upper and lower protruding portions include a cone shaped side wall.

3. The gasket according to claim 2, wherein the upper protruding portion of the compression limiters includes a planar upper surface, and the lower protruding portion of the compression limiters includes a planar lower surface.

4. The gasket according to claim 3, wherein the elastomeric body defines at least one sealing rib that on each of an upper and lower surface that each extend vertically above the planar upper surface and the planar lower surface of the compression limiters.

5. The gasket according to claim 1, wherein the elastomer body defines at least one sealing rib on each of an upper and a lower surface that each extend vertically above a surface of the plurality of plastic compression limiters.

6. The gasket according to claim 1, wherein the plurality of flow holes includes at least two flow holes.

\* \* \* \* \*